[11] 3,599,002

[72] Inventors Hans Beutelspacher
Braunschweig;
Wilhelm Horst Stegemann, Braunschweig-Stockheim, both of, Germany
[21] Appl. No. 851,555
[22] Filed Aug. 20, 1969
[45] Patented Aug. 10, 1971
[73] Assignee Heraeus-Christ G.m.b.H.
Osterode Harz, Germany
[32] Priority Aug. 22, 1968
[33] Germany
[31] P 17 98 101.0

[54] METHOD AND APPARATUS FOR CENTRIFUGING WHICH UTILIZE A SYNCHRONIZED FLASH TUBE AS THE LIGHT SOURCE
14 Claims, 1 Drawing Fig.
[52] U.S. Cl................................................. 250/217,
233/26, 250/218, 356/23, 356/36, 356/201
[51] Int. Cl....................................................... G02f 1/28,
G01n 1/00, G01n 21/06

[50] Field of Search........................................... 250/217,
218; 356/23, 36, 201; 233/26

[56] References Cited
UNITED STATES PATENTS
3,470,381  9/1969  Boyd.............................. 250/218
3,514,613  5/1970  Mashburn....................... 250/218

*Primary Examiner*—Archie R. Borchelt
*Assistant Examiner*—T. N. Grigsby
*Attorney*—Flynn & Frishauf ABSTRACT: Centrifuging apparatus having a light source shining through the samples being centrifuged is modified by providing a flash tube which flashes in synchronism with passage of the sample over a photoelectric pickup. The flash tube is controlled from a capacitive transducer, so that optical and inductive errors are avoided. More than one flash tube may be used, each flashed for a specific sample, and supplied with monochromators adjusted for maximum, or minimum absorption wave length.

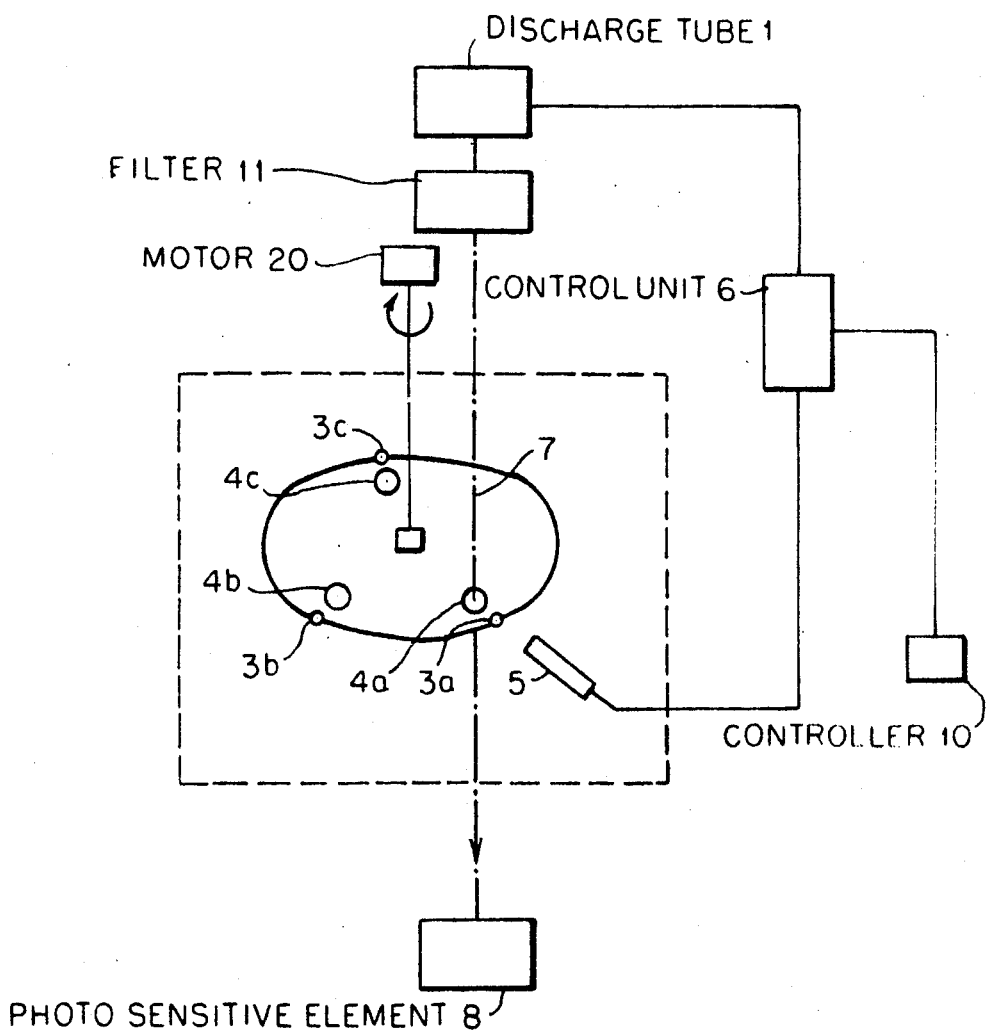

METHOD AND APPARATUS FOR CENTRIFUGING WHICH UTILIZE A SYNCHRONIZED FLASH TUBE AS THE LIGHT SOURCE

The present invention relates to a method and to an apparatus for optical determination of sedimentation rates by centrifuging, and more particularly to ultra high speed centrifuges operating together with a light source and a light pickup.

Determination of sedimentation of sample substances in ultra centrifuges has been described, see for example German Pat. publication 1,265,455. Sedimentation is determined by optically measuring he speed of movable Schlieren image. Optical arrangements to record the diffraction index gradient $(dn/dx)\ x$ in accordance with Toepler can advantageously be used in analytic ultra centrifuges to determine the sedimentation process, for example in the arrangement according to Philpot-Svensson (see German Pat. 1,222,283).

To determine the sedimentation process in ultra centrifuges, comparatively long centrifuging times are necessary in most cases. Light sources usually were continuously operating high energy lamps, having a spectrum of high intensity within the visible range, such as mercury vapor arc lamps. Due to the construction of the centrifuges, and the sample carriers on the rotor thereof, only about 5 percent of the light from the constantly operating light source is actually passed through the samples during any recording cycle. The remaining 95 percent of the radiation emitted from the light source impinges on the rotor structure carrying the samples, to be there converted into heat. In order to reproduce sedimentation rates, a constant temperature in the chamber where the centrifuging takes place, is desired. Use of a continuously operating light source interferes with maintenance of a reasonable constant temperature; additionally, subjecting the material to constant radiation may change results to be measured since the substance to be centrifuged may undergo photochemical reactions. The use of constantly operating water-cooled high-pressure lamps is not recommended, since such lamps are subject to deposits and blackening, even after comparatively short time of operation, which cut down the radiated light intensity. Air-cooled light sources have the disadvantage of comparatively strong heating, deleteriously influencing emitted radiation in the ultraviolet region of the spectrum, and limiting the utility of the light source.

It is an object of the present invention to provide a method, and apparatus for determining sedimentation by centrifuging, in which the light is used efficiently, does not interfere with the measuring process, so that reproducible results will be obtainable.

SUBJECT MATTER OF THE PRESENT INVENTION

Briefly, rather than using a constantly operating light source, a flash lamp is flashed in synchronism with the passage of the sample to be investigated over a photosensitive cell; the flashing of the lamp is controlled by a transducer rotating with the rotor of the centrifuge, preferably a capacitive transducer, in such a manner that the duration of the flash is in the order of the passage of time of the sample over the photosensitive cell, or even less. The capacitive transducer is energized by a signal having a frequency which is high with respect to the frequency which would be generated by an equivalent inductive apparatus—that is, the wavelength of the signal is short with respect to the distance of the travel of the capacitive elements with respect to each other, forming the transducer.

The start of the flashing of the flash lamp, which is preferably a gas discharge lamp, and the time of passage is so synchronized with the optical path, that the flash lamp only emits radiation when the sample carrier is in the path of the beam of light. Thus, the entire light energy obtained from the discharge lamp can be used to determine the sedimentation process. No light is wasted, and no light is directed to the rotor of the centrifuge itself, so that the temperature of the centrifuge can be maintained at an even value, ensuring good reproducibility of test results. Pulsed gas discharge tubes do not require special cooling, and have the advantage with respect to continuously operating lamps, that the emitted spectrum can be extended to very short wavelengths, reaching well into the ultraviolet region, without substantially influencing the emitted visible spectral band. Additionally, the light source as a lifetime substantially higher than that of lamps used under continuous operation.

The apparatus, and method of the present invention permits additional control, by flashing the light source only when certain sample carriers are in predetermined position. The transducer is preferably a capacitive transducer; it has been found that inductive transducers, and optical transducers are not suitable. Inductive transducers cause errors to occur due to remanence in the magnetic circuit; these errors, additionally, depend on motor speed, so that their compensation is difficult. Optical transducers may cause interference with the optical measuring path and may cause stray radiation, additionally contributing to errors during determination of the sedimentation. Use of the capacitive coupler further enables application to the transducer of a high frequency signal; the pulse derived upon passage of the movable transducer element can be differentiated to obtain a synchronizing signal which provides information on the position of the sample carrier with respect to the beam of light by detecting the steep passage of the differentiated signal through null.

The invention will be described by way of example with reference to the accompanying drawing, wherein the single FIGURE illustrates, in schematic form, the apparatus of the present invention, in connection with which the method will also be clear.

A rotor 2 of a high-speed centrifuge, as known in the art, is driven by means of a motor 20, schematically indicated. Rotor 2 is supplied with a plurality of sample carriers 4a, 4b, 4c, containing the solution having the substance contained therein, the sedimentation of which is to be optically determined, and, if desired, recorded. The rotor is so arranged that, during its rotation, each sample carrier 4a, 4b, 4c sequentially passes through a beam 7 of an optical system, for optically determining the sedimentation. Such optical systems, themselves, are known. A flash discharge lamp 1 provides the beam 7; flash lamp 1 is a gas discharge lamp, having a flash duration which, at maximum expected speed of rotor 2, is in the order of the passing time of any one of the cells 4a, 4b, 4c through the light beam, that is, having a flash duration which is not substantially longer than this passage time and preferably shorter. The sedimentation process itself is recorded at a photosensitive element 8, for example a photographic plate or film.

A capacitive movable transducer element 3a, 3b, 3c is associated with each one of the sample carriers 4a, 4b, 4c and secured to the rotor 2. Rotor 2 is located within a housing, schematically indicated at 9, to which a stationary part of a capacitive transducer 5 is secured. The counter electrodes 3, passing transducer head 5 during each revolution of the rotor, cause a sequence of pulses to be applied to a control unit 6. The frequency applied to the transducer 5 may be connected thereto in known manner, by a known signal generator. The frequency should be high with respect to the speed, and the linear extent of transducer elements 3a, 3b, 3c, so that a number of oscillations will be applied to transducer 5 during passage of any one of the capacitive elements 3a, 3b, 3c.

Control arrangement 6 preferably includes a counter, counting the pulses derived from transducer 5. Control pulses, derived for example from the first wave of the pulses applied to control unit 6 are connected to supply ignition pulses, connected to the discharge tube 1, so that discharge tube 1 will fire during passage of any one of the sample carriers 4a, 4b, 4c through the path of the optical beam 7.

A controller 10 can be connected to the control circuit 6. Control circuit 6 can be arranged to include a counter, the controller 10 inhibiting firing pulses being applied to gas discharge tube 1 unless a predetermined sample carrier, for example sample carrier 4a is in the path of the beam 7. Passage of carriers 4b, 4c through the path of the beam 7 will not cause application of a firing pulse to lamp 1 from control circuit 6, the sample carriers 4b, 4c operating in the dark and not influencing the measuring and recording process with respect to the selected carrier 4a.

The light derived from the gas discharge tube may be passed through a filter, or other arrangement providing for monochromatic output, and schematically indicated at 11. These filters may be fixed, or a plurality of filters may be selectively, and sequentially inserted in the path of the beam of light, so that rapid change of the selected wavelength of the beam applied to the sample carrier is possible. Any well known arrangement, such as a filter wheel, filter strip, or the like may be used. The wavelength of radiation applied to the samples can be so chosen that one wavelength corresponds to that of maximum absorption of the substance to be determined, while a second wavelength is so selected that it is not absorbed by the solution containing the substance. The quotient of the transmissivity of both wavelengths then provides a measure for the absolute light absorption, and thus the concentration of the substance in the solution. Passing the beam of light through the same sample carrier, but changing the wavelength, also permits determination of different components of the substances in the sample carrier if a mixture of substances in the solution is expected, the differences in maximum absorption of the substances enabling differentiations between the various substances.

More than one discharge tube 1 may be controlled by controller 6, although only one is shown in the drawing; these discharge tubes may be arranged to provide a path of light to the same, or to separate photosensitive receivers 8, and such that they will be in a position to simultaneously irradiate sequential samples on the carrier, for example in the apparatus shown in the drawing, three discharge tubes 1 could be arranged 120° offset from each other, or a single discharge tube may provide three paths of light to the measuring cells. The single or the plurality of discharge tubes can all be controlled from the same control circuit 6. Providing more than one discharge tube 1, each with its own absorption filter, enables rapid sequential determination of sedimentation by light of different wave lengths; for example, the wavelengths of the flashes from a first tube may be adjusted by a filter, or other monochromating device for maximum absorption, and an adjacent flash tube, providing a second beam generated when the sample carrier passes therebeneath, can then be adjusted to provide monochromatic light of a wavelength which is not absorbed by the solution containing the substance, in the sample carrier. Alternate operation of the flash lamps can again be controlled from the single control circuit 6 and appropriate transducer elements on the rotor, cooperating with fixed transducer 5, the particular flash lamps being connected in accordance with predetermined counts of pulses from transducer element 5 applied to control circuit 6.

The ultracentrifuge, the gas discharge lamps, and the circuits for their operation are all known; a discussion of flash tubes, and their circuits for their operation is found, for example, in the I.E.E.E. Spectrum, July 1969, PP 89 to 94, and references there cited, article by H. E. Edgerton, Vernon E. MacRoberts and Manmohan Khanna.

We claim:

1. Method of determining sedimentation utilizing a centrifuge, said centrifuge having a rotating sample carrier (4a, 4b, 4c), a light source (1) directing a beam of light (7) through the sample carrier,
   comprising the step of energizing said light source in intermittent flashes having a flash duration in the order of the time of passage of said sample carrier through the beam of light.

2. Method according to claim 1, wherein the step of intermittently operating the light source is carried out in a time duration less than the time of passage of said carrier through the beam.

3. Method according to claim 1, wherein the step of intermittently operating the light source includes the step of synchronizing flashing of the light with the passing of a particular sample carrier through the beam of light.

4. Method according to claim 1, including the step of applying an electrical signal of high carrier frequency to a capacitive transducer having a fixed element and an element associated with the rotating sample carrier; capacitively coupling said elements; and controlling the flashing of said light source by the capacitively coupled signals.

5. Method according to claim 1, including the step of monochromating the light beam directed through the carrier.

6. Method according to claim 1, including the step of monochromating the light beam of successive flashes directed through the carrier and selecting waves of different wavelengths during successive flashes.

7. Method according to claim 6, wherein the step of selecting the wavelengths includes the step of selecting one wavelength to be at the absorption maximum of the substance in the sample carrier.

8. Method according to claim 7, wherein the step of selecting the wavelengths includes the step of selecting another wavelength to be of the wavelength not absorbed by the solution in the sample carrier.

9. Centrifuging apparatus having a rotatable sample carrier; means generating a directed beam of light through samples on the carrier, and light detecting means receiving the beam after having passed through the carrier, said light generating and directing means comprising
   a flash tube (1); and
   means energizing said tube to flash in synchronism with the rotation of the carrier and when the sample carrier is in line with the light beam and the light-detecting means.

10. Apparatus according to claim 9, including a capacitive transducer (3a, 3b, 3c; 5) located in capacitively coupled relationship with respect to the rotating carrier; and
    control means (6) activated by pulses from said transducer and connected to said flash tube (1) and controlling flashing thereof.

11. Apparatus according to claim 10, wherein the control means includes a counter counting pulses from said transducer and connected to control flashing of the tube only upon predetermined counts having been reached.

12. Apparatus according to claim 10, wherein said capacitive transducer comprises a stationary element and a rotating element rotating with said carrier, said stationary element being energized with signals having a wavelength short with respect to the linear extent of overlap of said elements.

13. Apparatus according to claim 9, wherein said light generating and directing means comprises a plurality of flash tubes flashing in synchronism with the rotation of the carrier, said tubes being energized to flash upon passage of the same carrier through respective beams of light from said tube; and
    monochromatic means in the path of the light from said tube.

14. Apparatus according to claim 9, wherein the monochromating means associated with one beam of light selects light in the wavelength of maximum absorption of a substance in solution in said carrier; and
    the monochromatic means associated with another tube selects a wavelength not absorbed by the solution in the carrier.